May 11, 1954  L. C. H. JUY  2,677,984

NUT SYSTEM

Filed Sept. 8, 1950

Inventor:
LUCIEN CHARLES
Hippolyte Juy
by: J. Delatter Segur
Attorney

Patented May 11, 1954

2,677,984

UNITED STATES PATENT OFFICE 2,677,984

NUT SYSTEM

Lucien Charles Hippolyte Juy, Dijon, France

Application September 8, 1950, Serial No. 183,859

Claims priority, application France
September 12, 1949

2 Claims. (Cl. 85—32)

In the systems proposed for rapidly fastening hubs of bicycles and the like vehicles through the agency of cams, slopes or eccentrically mounted parts, there are incorporated parts that are difficult to machine by reason of the very presence of sloping surfaces, guiding members or elongated openings adapted to further the action of the tractional stresses as near as possible the axis of the spindle to be actuated.

My invention has for its object to provide an arrangement where the tractional stresses are applied axially of the system and the parts are easy to machine aand consequently cheap to manufacture while ensuring a gradual fastening of the parts. This result is achieved in accordance with the invention through the agency of a control lever carrying a disc-shaped member the outer surface of which is adapted to operate as a clamping surface and that is provided with an eccentric transversal opening, said opening carrying the pivotal spindle of the lever that is centrally carried between the sides of a yoke housed inside a clamping head whereby the pivoting movement of the lever and eccentrically apertured disc produces a gradual shifting between the surface of the lever spindle bearing against the inner periphery of the opening in the disc and a key bearing against the outer surface of the disc and matching the outline of said periphery, so that said key may move slidingly inside the strap to urge the fastening head against a lug on the bicycle frame as provided through projections on the key adapted to bear against a corresponding bearing on said head while conversely and at the same time, a tractional stress is exerted by the lever spindle on the yoke rigid with a longitudinal spindle passing through the hub, said latter spindle carrying at its other end, as known per se, an adjustable support defining the position for which the clamping action is exerted. This provides for an efficient clamping without any lack of circularity of the opening or any machining of complicated sloping or guiding parts being required.

A preferred embodiment, that is not to be considered as limiting by any means the scope of my invention as defined in accompanying claims, is illustrated in accompanying drawings wherein:

Figure 1:
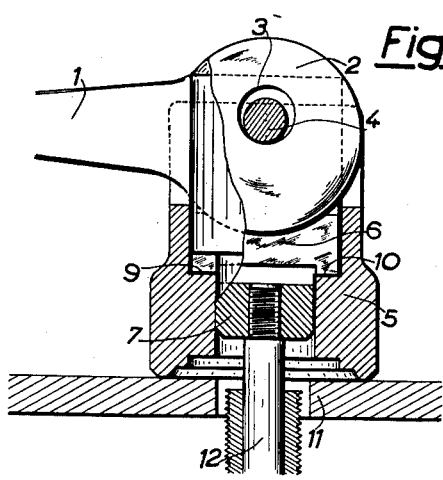
Fig. 1 is a view of my improved nut system in its operative position and Fig. 1a is a similar view of this system in its released position.
Figure 3:
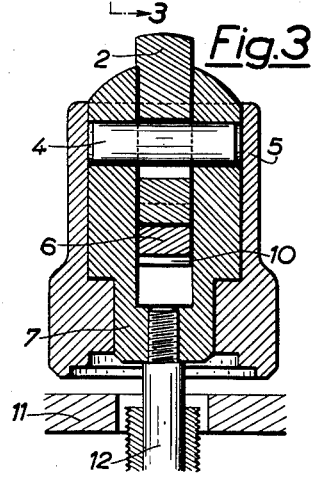
Figure 4:
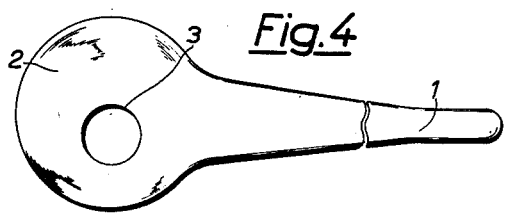
Figs. 4 and 5 are elevational views respectively of the lever and associated eccentrically apertured disc and of the key forming part of the system.
Figure 5:
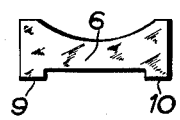

In said drawings, there is shown a clamping lever 1 controlling a disc 2 rigid therewith and provided eccentrically with an opening at 3. As illustrated, the lever and disc form a unitary member as more clearly apparent from inspection of Fig. 4. Obviously the two parts may be suitably assembled together for the same purpose. Preferably and as illustrated the outer surface of the disc forms a cylindrical surface and inside its eccentric opening 3 is mounted a spindle 4 the diameter of which is clearly smaller than that of the opening in the disc 2. Said disc in held vertically between the arms of an upstanding yoke 7 carrying the spindle 4 and may revolve in contact with the spindle 4 so that the aperture therein may assume for an angular shifting of the disc through 180° two positions that are symmetrical with reference to a horizontal plane as clearly illustrated in Fig. 1 and Fig. 1a. The outer cylindrical surface of the disc 2 matches the inner part-cylindrical or arcuate recess formed in the upper surface of the key 6 which is also slidably carried inside the vertical slideway formed by the two arms of the yoke 7 as shown in Fig. 3. By reason of the matching of the vertical cooperating surfaces of the disc 2 and key 6, the geometrical axis of the disc 2 is constrained to remain in vertical alignment with the medial section of the arrangement, which medial section coincides with the cross section of Fig. 3. This explains the symmetric location of the spindle opening 3 for the two extreme positions illustrated in Fig. 1 and Fig. 1a for which its axis is in vertical register with the geometrical axis of the disc 2.

Figure 1A:
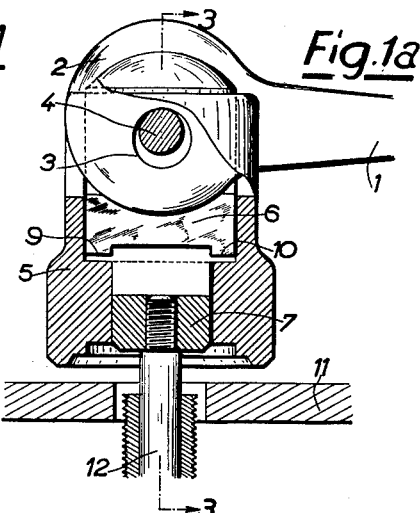

The spindle 4 is held inside two aligned recesses 8 formed in the yoke 7 so that the rocking of the lever 1 constrains said vertically guided key 6 to be shifted betweeen a lower position engaging shoulders at the lower end of the head 5 adapted to slide vertically over the yoke 7, and an upper position illustrated in Fig. 1a for which said head 5 is released. The spindle 4 is held inside the yoke through the openings 8 with friction or again with a slight clearance and the pressure exerted through the lever 1 is transmitted through the front and rear ends 9 and 10 of the key 6 to the above mentioned shoulders of the head 5 which latter is thus constrained for the position on Fig. 1 to engage the securing lug 11, on the bicycle hub.

The operation of the arrangement is as follows:

The lever 1 being caused to rock together with the disc 2, the opening 3 in the latter bears against the lower side of the spindle 4 while the cylindrical surface of the disc 2 remains in contact with the arcuate recess in the key 6 and urges after the manner of a wedge said key downwardly with reference to the system including the spindle 4, the yoke 7 and the spindle 12 that is screwed into it whereby a relative movement is ensured between said spindle 12 and the head 5 depressed by the key 6. The reverse movement releases the head 5 with reference to the lug 11, and consequently to the hub carried by said lug (Fig. 1a).

The spindle 12 passes through the hollow axial portion of the hub in accordance with the usual standards and it ends with a thread or any other known or suitable stopping means engaging a stop forming an adjustment of the length of stroke and defining consequently the moment at which the clamping action is produced. This latter arrangement, that is known per se and which requires therefore no special description, is not illustrated.

Figure 2:
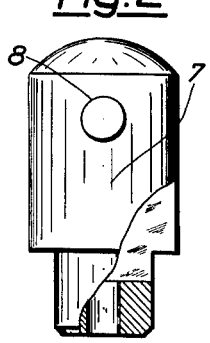
Figs. 2 and 3 illustrate respectively the yoke in front view and the whole system in vertical sectional view.

In Figs. 2 and 3 it will be noticed that the key 6 is executed in a manner such that it may cooperate in the centering of the member 2 through its incurved or V-shaped configuration so as to return the symmetrical location of the member 2 with reference to the head 5 and yoke 7 during the clamping operation and to produce the tractional stress exactly in the direction of the axis of the yoke 7 and consequently of the spindle 12. Obviously, if the member 2 is held through any other known means, the key 6 may be provided with a contacting surface of smaller area that is however, always aligned with the axis of the arrangement at a point where the tractional action is a maximum.

On the other hand, the fact that the peripheries of parts 2 and 3 do not have the same center produces the desired clamping action. At the beginning of the movement, the angular shifting of the handle 1 produces a longitudinal shifting of the head 5 that is comparatively rapid and of a somewhat considerable amplitude, say e. g. for a movement of the lever 1 through 90°.

Then after, the further movement of the lever 1, say again through 90°, provides only a very small longitudinal movement of the head 5 up to the moment where the fastening is at a maximum, i. e. up to the point (Fig. 1) where the maximum distance exists between the respective centers of the peripheries 2 and 3. If the force exerted on the lever 1 is supposed to be a constant one, the clamping pressures will, according to known mechanical principles, increase in the reverse ratio with reference to the path followed and consequently at the end of the clamping, a maximum pressure will be obtained for securing the hub considered.

Obviously and as apparent from the preceding disclosure, my invention is by no means limited to the above embodiments and it includes all modifications thereof falling within the scope of the accompanying claims.

What I claim is:

1. A nut system for urging two parts into contact, comprising: a yoke having two elongated arms respectively disposed on either side of a relatively narrow medial gap, said yoke, said arms and said gap having a common plane of symmetry median of said gap; rigid and removable connecting means between the bottom of said yoke and one of said parts, said connecting means having an axis of symmetry located in said plane of symmetry; an outer member slidably disposed around said yoke to slide in a direction parallel to said plane of symmetry and adapted to frictionally engage the second of said parts; a spindle extending across the upper portion of said arms at right angles to said plane of symmetry; a movable cam disc supported by said spindle, disposed between said arms and rotatable around said spindle; said cam disk having a cylindrical periphery and an eccentric bore; said spindle passing through said bore, the diameter of said bore being greater than that of said spindle; a key movably fitted in said gap between said disc and the bottom of said yoke, said key being slidable in said gap in directions parallel to said plane of symmetry, and having an upper indented arcuate surface complementary to and engaging the cylindrical periphery of said disc; said key having an axis of symmetry constantly in said plane of symmetry and constantly coaxial with the axis of symmetry of said connecting means; cooperating surfaces located respectively in the lower inner portion of said outer member and at the opposite ends of the lower face of said key; and setting lever means rigidly connected with said disc and disposed along said plane of symmetry.

2. A nut system as claimed in claim 1, in which said yoke arms have inner plane surfaces parallel to said plane of symmetry, said upper indented arcuate surface of said key having a radius equal to the radius of the periphery of said disc; and in which said cooperating surfaces comprise inwardly directed shoulders on said outer member and downwardly extending projections on said key, said shoulders and said projections being in vertical registry with each other.

References Cited in the file of this patent

UNITED STATES PATENTS

| Number | Name | Date |
|---|---|---|
| 227,856 | Stoddard | May 18, 1880 |
| 256,026 | Morden | Apr. 4, 1882 |
| 408,364 | Traut | Aug. 6, 1889 |
| 716,288 | Schneider | Dec. 16, 1902 |
| 1,297,539 | Bull | Mar. 18, 1919 |
| 2,405,251 | Glaze | Aug. 6, 1946 |
| 2,464,133 | Herbert | Mar. 8, 1949 |

FOREIGN PATENTS

| Number | Country | Date |
|---|---|---|
| 431,004 | Italy | Feb. 23, 1948 |